US005550592A

United States Patent [19]

Markandey et al.

[11] Patent Number: 5,550,592
[45] Date of Patent: Aug. 27, 1996

[54] FILM MODE PROGRESSIVE SCAN CONVERSION

[75] Inventors: Vishal Markandey, Dallas; Gregory J. Hewlett, Garland, both of Tex.

[73] Assignee: Texas Instruments Incorporated, Dallas, Tex.

[21] Appl. No.: 429,254

[22] Filed: Apr. 25, 1995

[51] Int. Cl.⁶ .............................. H04N 7/01; H04N 11/20
[52] U.S. Cl. .......................................... 348/448; 348/452
[58] Field of Search ............................ 348/441, 443, 348/442, 444, 445, 446, 447, 448, 449, 451, 452, 455–459, 607, 618, 619, 620, 699, 700–702, 96, 97; H04N 7/01, 11/20, 11/22

[56] References Cited

U.S. PATENT DOCUMENTS

| | | | |
|---|---|---|---|
| 4,731,648 | 3/1988 | Bernard et al. | 348/700 |
| 4,876,596 | 10/1989 | Faroudja | 348/450 |
| 4,933,759 | 6/1990 | Van der Meer et al. | 348/97 |
| 4,982,280 | 1/1991 | Lyon et al. | 348/448 |
| 5,289,305 | 2/1994 | Lake, Jr. | 348/441 |
| 5,291,280 | 3/1994 | Faroudja et al. | 348/447 |
| 5,365,273 | 11/1994 | Correa et al. | 348/449 |
| 5,398,071 | 3/1995 | Gove et al. | 348/443 |

OTHER PUBLICATIONS

Gove, et al., "High Definition Display System Based On Degital Micromirror Device", Oct. 26–28, 1994.
Markandey, et al., "Motion Adaptive Deinterlacer for DMD (Digital Micromirror Device) Based Digital Television", Jun. 21–23, 1994.

*Primary Examiner*—James J. Groody
*Assistant Examiner*—Michael H. Lee
*Attorney, Agent, or Firm*—Julie L. Reed; James C. Kesterson; John D. Kaufmann

[57] ABSTRACT

A system (22) and method for converting to progressive scan interlaced video data (28) that was originally produced on film and converting to interlaced data. The most recent previous field and the second most recent field are stored. The most recent previous field is compared to the current field and the second most recent field to generate two motion signals. The field that generated the smallest motion signal when compared to the most recent previous field is then used to perform field insert for that field. The field insert results in progressive frames of data of the image that was produced originally on film. The system determines whether the film conversion is necessary, or whether the data is used for conventional-format progressive scan conversion.

4 Claims, 1 Drawing Sheet

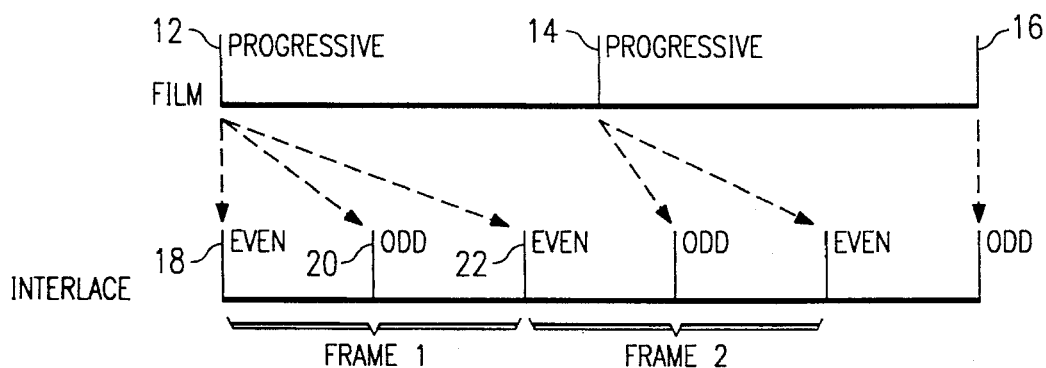
FIG. 1
(PRIOR ART)
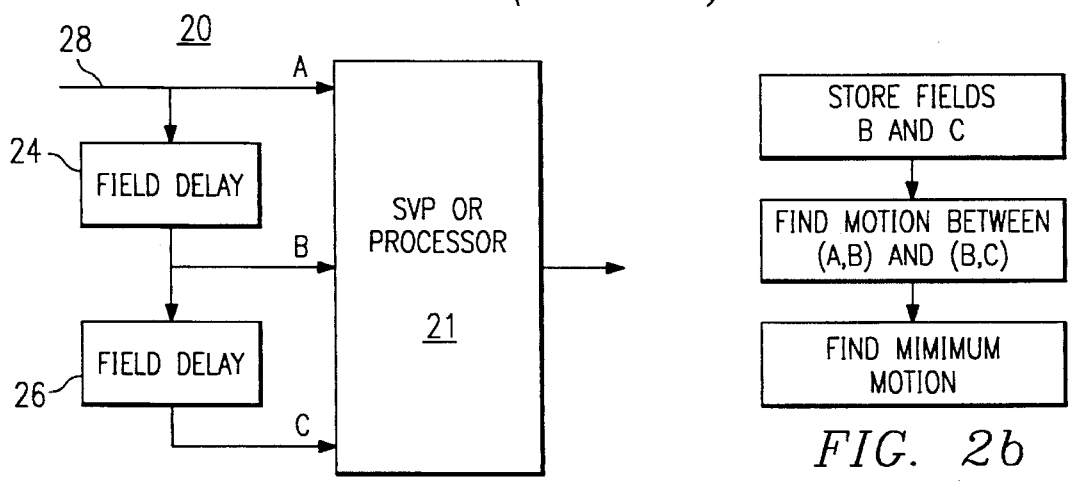
FIG. 2a
FIG. 2b
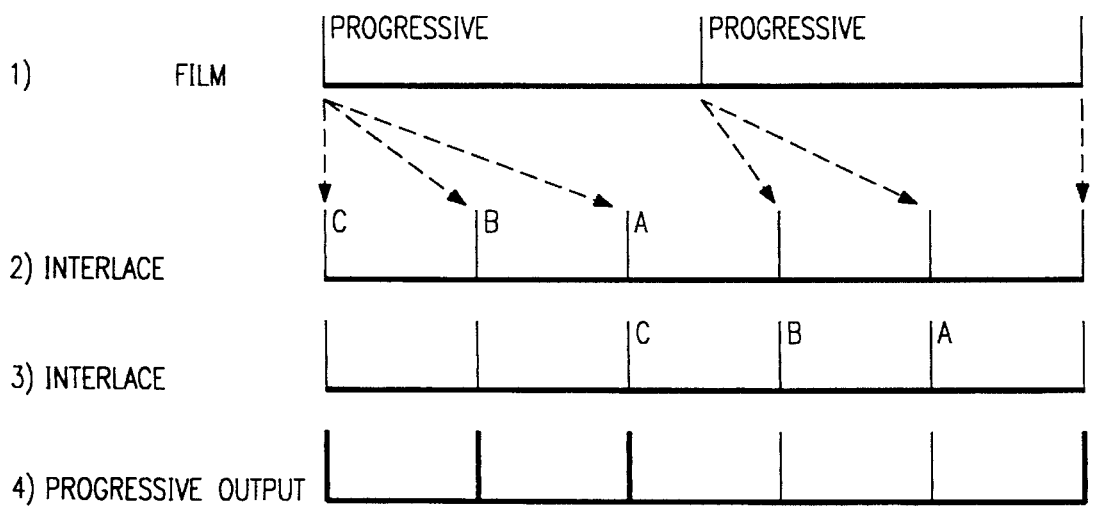
FIG. 3 ns. 5,550,592

FILM MODE PROGRESSIVE SCAN CONVERSION

BACKGROUND OF THE INVENTION

Related Applications

This application is concurrently filed with U.S. patent Ser. No. 08/430,774, (TI- 19475) titled "LOW COST PROGRESSIVE SCAN TELEVISION WITH SPECIAL FEATURES."

1. Field of the Invention

This invention relates to television systems with interlaced input, more particularly to television systems that convert interlaced input to progressive scanned data.

2. Background of the Invention

Most typical broadcast television standards consist of interlaced fields. A typical video frame is transmitted in two fields, the first field normally contains the odd numbered lines of the frame, the second contains the even numbered lines. Typical display systems use the incoming data for display on a cathode-ray tube, but other options are available for displaying the data.

Spatial light modulators typically consist of arrays of individual elements, each addressable by memory cells. The addressing is typically done along columns of the array. This makes the addressing necessary to accommodate interlaced data very difficult and often too slow. Progressively scanned pictures result in a better utilization of the modulators. Also, progressively scanned pictures result in better picture quality, especially with larger projection; size images as are available with spatial light modulators.

A special problem arises when the desired data to be converted to progressive scan is from film sources. Film is an inherently progressive, 24 MHz material. Systems operating in NTSC typically convert to 60 Hz interlace by means of a 3:2 pulldown as shown in FIG. 1 (prior art). The frame input arrives with complete frames as shown at frame boundaries 12 and 14. The first frame between boundaries 12 and 14 is scanned such that the even numbered lines go to frame 1, even, between boundaries 18 and 20, and the odd numbered lines go to frame 1, odd, between boundaries 20 and 22.

The even numbered lines from the first film frame also go to the even numbered lines for frame 2, even. Frame 2, odd, is made up of the odd numbered lines from the second film frame, between boundaries 14 and 16. The even numbered lines for frame 3 come from the second film frame. Frame 3, odd, would then be from the third film frame. As can be seen by this example, it is referred to as 3:2 pulldown, because every other frame contributes 3 fields to the interlaced input, and the offset frames contribute 2 field to the interlaced input. For 50 Hz sources, such as PAL, the film is merely run at 25 Hz and doubled to fill the 50 Hz interlaced requirement.

Some methods for converting back from the interlaced to progressively scanned sources include a means for detecting which field is from the 3-segment frame and which is from the 2-segment frame, by incorporating a code into the data driving the 3:2 pulldown operation. This code can then be read by the processor at the display end and it can use the appropriate fields to regain the original film data at 60 Hz. A second solution uses a processor to implement a pattern detector that detects the 3-2-3-2 pattern of 3:2 pulldown and marks the corresponding fields to recover the original film. This solutions are more completely discussed in U.S. Pat. Nos. 4,876,596 and 4,982,280 assigned to Faroudja, Inc. These approaches require either an explicit specification of 3:2 pulldown, or the ability to detect the pattern. A more general approach is needed that is general enough to work without requiring explicit specification at the transmission end or detection of the 3-2-3-2 pattern.

Additionally, one problem with these solutions lies in the area of motion detection. Incorrect motion detection leads to visual artifacts, such as tearing on moving areas, blurriness in the presence of motion due to line averaging, and blocky reconstruction of oriented edges. Current progressive scan processes can eliminate these problems, but require extra processing time and more memory, leading to increased costs.

SUMMARY OF THE INVENTION

A system and method for converting interlaced video data produced from images originally produced on film is disclosed. The system includes a processor and two field memories that store the most recent previous video field and the second most recent video field. The processor performs a comparison between the most recent previous field and both the current incoming field and the second most previous field to determine which field to use for generating progressive video frames.

It is an advantage of the invention in that it does not require either insertion of a code for identification of the film format at the transmission end, nor a decoder at the receiving end.

It is a further advantage of the invention in that it does not require any user input when the incoming video is not data that was originally produced on film, since the invention is transparent to the user.

It is a further advantage of the invention in that it does not require a field-level detection of the 3-2 pattern.

BRIEF DESCRIPTION OF THE DRAWINGS

For a more complete understanding of the present invention and for further advantages thereof, reference is now made to the following Detailed Description taken in conjunction with the accompanying Drawings in which:

FIG. 1 shows a prior art implementation of a 3:2 pulldown method of convening a film source to progressive scan.

FIGS. 2a and 2b show a processing flow chart and a block diagram of a circuit which allows the interlaced to progressive scan conversion of film sources.

FIG. 3 shows a graphical representation of the operation of a circuit which allows a circuit to perform interlaced to progressive scan conversion for film sources.

DETAILED DESCRIPTION OF THE PREFERRED EMBODIMENTS

Film sources are inherently progressive, yet must be converted to interlaced fields for display in most broadcast television formats. For progressively scanned displays, it seems more logical to try to recover that original progressive nature than to convert to a third format. Viewers would see a better picture and a closer approximation of movie theater quality. One way of offering this higher quality would be to include a special feature on the television system that allows the viewer to select "film mode" when watching a movie not made for television. The inclusion of this feature can be accomplished with a minimal extra cost, and the extra circuitry put to other uses when the set is not in film mode.

FIG. 2a shows a block diagram of a circuit which is capable of implementing an improved procedure for converting interlaced data originally shot on film back to progressively scanned data from interlaced data. Circuit 20 consists of a scan-line video processor (SVP) or other processor 21, and two field delays, 24 and 26. The incoming data on line 28 is the data for the current field, A. The most recent previous field has been held in the first field delay 24 will be referred to as field B. The second most previous field has been held in field delay 26, and will be referred to as field C.

The processes performed by this circuit are shown in graphical form in FIG. 3 and in flow-chart form in FIG. 2b. If, for example, progressive scan is to be performed on a pixel in field B, a motion signal results from a comparison of fields B and C, signal M1. A second motion signal is found by comparing field B with the following field, field A, for a second motion signal M2. Finding the motion signals between two fields next to each other in interlaced data requires some processing. Recalling that field B will have either the even or odd numbered lines of a frame, and fields A and C will have the even numbered lines of the same frame or the just previous frame.

The scalar motion signal M1 has been defined as the motion difference between fields B and C. The arrangement of part of the lines from these two fields would be similar to:

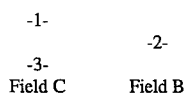

Field C      Field B

The motion signal M1 corresponding to Pixel 2 would be found using the minimum of the absolute quantities (Pixel 2–Pixel 1), and (Pixel 2–Pixel 3).

$M1 = \text{MIN}(|\text{Pixel 2} - \text{Pixel 1}|, |\text{Pixel 2} - \text{Pixel 3}|)$.

This is described in more detail in copending U.S. patent application Ser. No. 08/430,774 (TI-19475).

In this embodiment of the invention, a second scalar motion signal M2, would be found in a like manner between Field B and Field A.

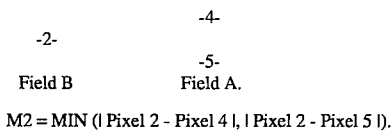

Field B      Field A.

$M2 = \text{MIN}(|\text{Pixel 2} - \text{Pixel 4}|, |\text{Pixel 2} - \text{Pixel 5}|)$.

If the source is film converted using 3-2 pulldown, each field will have at least one neighbor form the same frame, as seen in FIG. 3. Looking at line 2 and line 3, INTERLACE, in FIG. 3, field C would have field B from the same frame as its neighbor; field B has both fields C and A as neighbors; and field A has field B as a neighbor from the same frame. The motion signal between those pairs would be zero except for noise or high spatial frequency patterns. The minimum of M1 and M2 would be close to zero, as in k=MIN(M1, M2). Line 4, PROGRESSIVE OUTPUT, in contrast, has two fields from the first frame, shown by the heavy vertical lines, and two fields from the second frame, positioned as shown by the lighter lines.

This implementation of 3:2 pulldown detection remains transparent to the user. The viewer has no need to know whether the picture viewed came from a source that was originally film or not. A threshold value, T, is set for the value k described above. The threshold can also be set in such a manner so as to reduce noise in the system.

If the motion signal, k, is below the threshold value, T, (k< T), the system performs the film conversion described above, using field insert. Field insert takes a pixel at the same location as the pixel being created from either field A or field C and inserts it into field B. The selection of A or C depends upon which scalar motion signal, M1 or M2, is smaller. For example, if M1< M2 than field insert would be performed from field A.

If the motion signal, k, is above the threshold value, T, (k> T), the system simply uses it as the motion signal for a conventional-format progressive scan conversion as in copending U.S. patent application No. 08/430,774 (TI-19475).

Thus, although there has been described to this point particular embodiments of a film mode progressive scan process and circuit, it is not intended that such specific references be considered as limitations upon the scope of this invention except in-so-far as set forth in the following claims.

What is claimed is:

1. A television system with progressively scanned display, including:

an input line for transmitting a current video field of data originally produced on film;

a first memory for storing data for a most recent previous video field;

a second memory for storing data for a second most previous video field;

a processor for comparing said most recent previous field with said current field and said second most previous field such that a motion signal is selected by comparing motion signals between said current field and said most recent previous field, and between said most recent previous field and said second most previous field, wherein said minimum motion signal is used to generate progressive frames of said data originally produced on film; and a spatial light modulator for displaying said progressive frames of video data as an image.

2. The system of claim 1 wherein said processor is operable to set a minimum threshold for said minimum motion signal to reduce noise effects.

3. A method of converting interlaced video data originally produced on film to progressively scanned video data, comprising:

storing a most recent previous video field and a second most recent previous video field in a memory;

receiving a current video field;

generating motions signals between said current video field and said most recent previous video field and between said most recent previous field and said second most recent video field;

comparing said motion signals and selecting that which has smaller magnitude;

performing field insert for said most recent previous field using whichever of said fields generated the smallest motion signal when compared with said most recent previous field, such that said field insert results in a sequence of progressive video frames from said video data originally produced on film; and displaying said progressive video frames on a spatial light modulator to create an image.

4. The method of claim 4 wherein said method includes a further step of setting a minimum threshold for said smallest motion signal to reduce noise effects in said image.

* * * * *